United States Patent [19]
Jacobs

[11] 4,272,694
[45] Jun. 9, 1981

[54] SYSTEM FOR CONVERTING THE FREQUENCY OF COHERENT RADIATION

[75] Inventor: Stephen D. Jacobs, Pittsford, N.Y.

[73] Assignee: The University of Rochester, Rochester, N.Y.

[21] Appl. No.: 94,402

[22] Filed: Nov. 15, 1979

[51] Int. Cl.³ .............................................. H01S 3/13
[52] U.S. Cl. .................................... 307/427; 307/425
[58] Field of Search ................... 307/427, 425

[56] References Cited
U.S. PATENT DOCUMENTS 4,181,899  1/1980  Liu ................................ 331/94.5 C

OTHER PUBLICATIONS

"Japan Journal of Applied Physics", vol. 10, p. 808 (1971).
Attwood et al., "Optics Comm.", 15 1,10 (Sep. 1975).
Armstrong et al., "Phys. Rev.", 127, 6, 1918, Sep. 1962.

*Primary Examiner*—David C. Nelms
*Assistant Examiner*—Darwin R. Hostetter
*Attorney, Agent, or Firm*—Martin LuKacher

[57] ABSTRACT

Coherent radiation which may be provided at high power and in a wide aperture beam is tripled in frequency by Type II crystals having non-linear optical coefficients. A waveplate along the beam path between the crystals corrects ellipticity which limits the conversion efficiency of the system.

15 Claims, 1 Drawing Figure

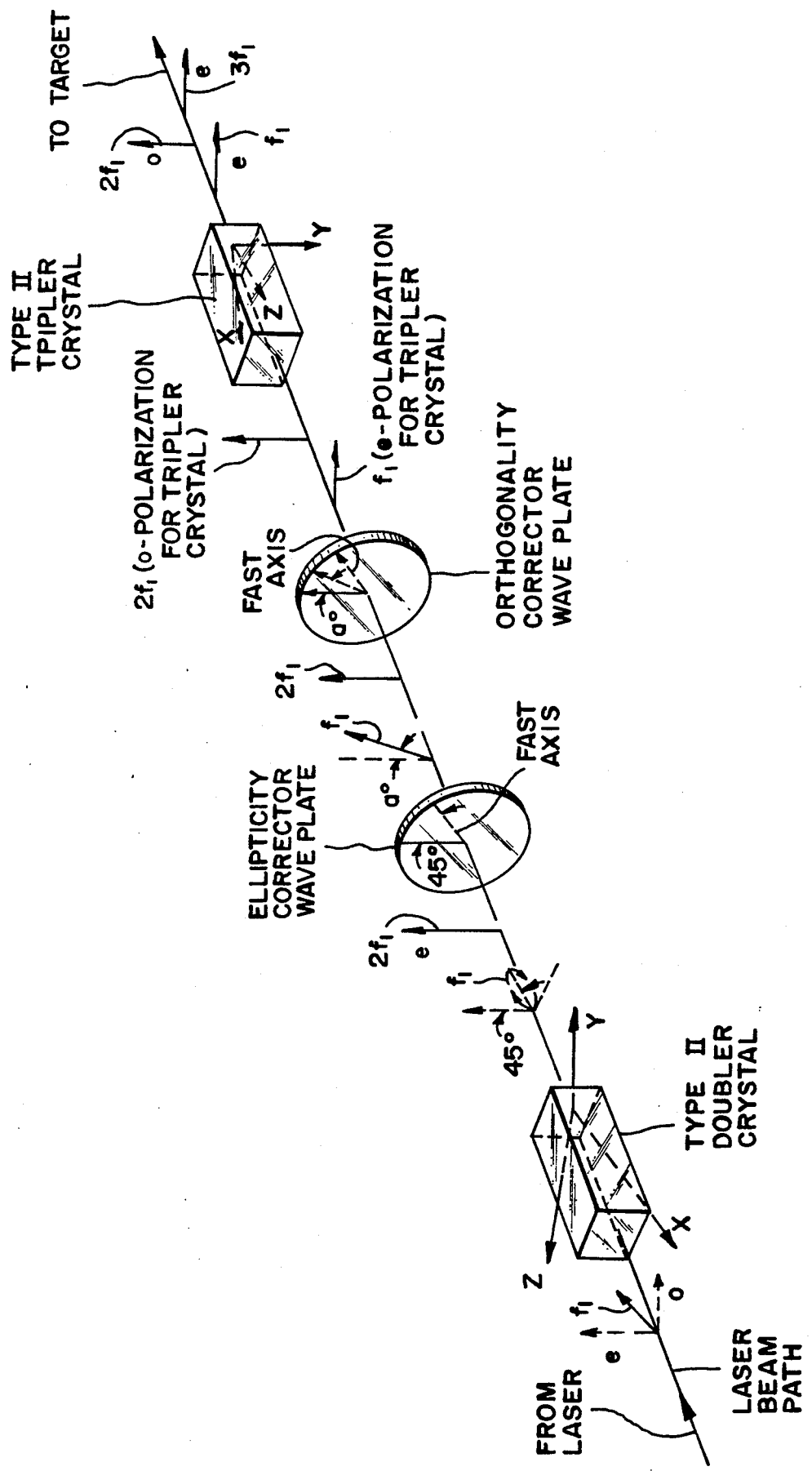

SYSTEM FOR CONVERTING THE FREQUENCY OF COHERENT RADIATION

DESCRIPTION

The present invention relates to a system for converting the frequency of coherent radiation, and particularly to a system using crystals having non-linear optical coefficients for tripling the frequency of input coherent radiation.

The invention is especially suitable for use in generating higher harmonics of high power laser beams having large apertures such as the approximately 1.06 micrometer (um) output from a neodymium-glass (Nd:glass) laser which may result in increased absorption and increased neutron production by a fusion fuel containing material, when irradiated by such higher harmonics.

Frequency tripling has been reported using crystals having non-linear optical coefficients, where a Type I crystal is followed by a Type II crystal with a waveplate therebetween for rotating the polarization of the fundamental wave emerging from the Type I crystal to put it in proper phase relationship with the polarization of the second harmonic of the wave for tripling in the Type II crystal (see *Japan Journal of Applied Physics*, Volume 10, Page 808 (1971)). Type II crystals are more desirable for use as harmonic generators than Type I crystals because of their higher operating efficiency and because the alignment thereof with the incoming beam is less critical (see Machewirth et al., *Laser Focus*, May, 1976). Type II crystals, however, induce ellipticity to the fundamental wave emerging therefrom. The ellipticity prevents attainment of the requisite orthogonality between the fundamental and second harmonic waves in the tripler crystal and thus limits the conversion efficiency of the system. The amount of ellipticity introduced is not repeatable and depends upon crystal thickness, angle of incidence of the incoming beam at the crystal, and temperature. In other words the second harmonic generating crystal is an unspecified order or unknown variable retarder making it impracticable to use; a special waveplate being necessary for each use. It is a feature of the present invention to provide means for correcting the ellipticity problems that limit conversion efficiency in harmonic generators using crystals having non-linear optical coefficients and particularly to enable Type II crystals to be used both as the doubler and tripler in a third harmonic generator system.

Accordingly, it is an object of the invention to provide an improved optical system for wavelength conversion of coherent radiation.

It is a further object of the invention to provide an improved system for wavelength conversion of high power laser beams.

It is a still further object of the present invention to provide an improved system for tripling the frequency of laser radiation of wavelengths in the infrared region such as produced by Nd:glass lasers.

It is a still further object of the invention to provide an improved system for generating the third harmonic of higher power laser radiation using crystals having non-linear coefficients where limitations on conversion efficiency are substantially eliminated.

It is a still further object of the present invention to provide an improved system for converting the wavelength of input laser radiation to a wavelength which is the third harmonic thereof and which uses two non-linear Type II crystals through which a beam of laser radiation successively passes and which obtains the high efficiency and reduced sensitivity to crystal misalignment of operation with Type II crystals as both crystals in the system.

Briefly described, a frequency conversion system in accordance with the invention utilizes first and second crystals having non-linear optical coefficients. These crystals are disposed along the path of a beam of coherent radiation, as from a high power Nd:glass laser which operates in the infrared (approximately 1.06 um). Between the crystals and in the path of the beam emerging from the first crystal and entering the second are located first and second waveplates which have different effects upon the fundamental frequency component and the second harmonic component of the input radiation. The first waveplate preferably is a quarter wave retarder for the fundamental and converts any elliptically polarized radiation to linear polarized radiation; thus removing the limitations of ellipticity on conversion efficiency in the second crystal. The second waveplate is preferably a half wavelength retarder for the fundamental and orthognalizes the fundamental and second harmonic components of the beam for tripling in the second crystal.

The foregoing and other features, objects and advantages of the invention as well as a presently preferred embodiment thereof will become more apparent from a reading of the following detailed description in connection with the accompanying drawing, the sole FIGURE of which is a perspective diagram schematically illustrating the preferred embodiment.

The input radiation is generated by a laser such as a Nd:glass laser. The fundamental wavelength of the input radiation then is approximately 1.06 um. Consider for purposes of this example that the fundamental wavelength is 1.054 um. This radiation may be of high power. For example, a sub-nanosecond pulse of the order of a terawatt, such as prolonged by an Nd:glass fusion laser. The laser pulse propagates along a beam path to a target which may be a body of laser fusion fuel, such as DT contained in a microballoon. The system triples the frequency of the input radiation from the laser and generates radiation at 0.351 um. The input radiation may have linear or circular polarization. For purposes of this example consider that the input radiation of fundamental frequency $f_1$ is linearly polarized.

This input wave is incident on a Type II crystal having non-linear optical coefficients. Such crystals belong to a group called noncentrosymmetric crystals. The processes by which these crystals generate harmonics of a wave propagating therethrough and a listing of many crystals which have non-linear optical coefficients is found in the text, *Introduction To Optical Electronics*, by A. Yariv, published by Holt Reinhart and Winston (1971), see particularly Chapter 8, Sections 8.0 to 8.4. Such crystals have a noncentrosymmetric crystalline structure. In this preferred embodiment of the invention the harmonic generator crystals are Type II crystals. Such crystals are cut with their optic or z axis in a certain orientation. Such crystals are described in the above referenced article by Machewirth et al., and in an article by Anafi et al., which appeared in Optical Spectra, December 1975. Methods for growing such crystals and particularly of KDP and CDA crystals where the hydrogen is replaced by deuterium are described in Loiacono, *Acta Electronica*, 18, 3, 241 (1975). In this example of the invention, Type II KDP crystals are used both as the doubler and tripler crystals in the system.

The linearly polarized input wave enters the doubler crystal with its polarization direction at 45° to the projection of the optic (z) axis of the crystal on the crystal entrance face. The ordinary and extraordinary polarization components of the wave (shown as the e and o vectors adjacent to the input linear polarization vector of the fundamental $f_1$) are orthogonal to each other as is required for harmonic generation in the Type II doubler crystal. The direction of propagation of the laser beam through the crystals (the laser beam path) is oriented at the angle which produces proper phase matching in the crystals. This angle is approximately 59° to the optic (z) axis of the crystal for laser radiation of 1.054 um in KDP crystals. The x-z plane is ordinarily marked on the crystals by the manufacturer. Such crystals are available from Lasermetrics, Inc. of Teaneck, N. J. and from Cleveland Crystals Inc. of Cleveland, Ohio.

Emerging from the doubler crystal is the fundamental $f_1$ and the second harmonic at $2 f_1$. The fundamental undergoes retardation in the doubler crystal which is a function of the thickness of the crystal, d, the wavelength, $\lambda$, the matching or tuning angle $\theta$ and the indices of refraction $n_o$ and $n_e$ to which the extraordinary and ordinary waves are subject. The retardation in wavelengths at the fundamental is governed by the following equation:

$$\frac{d}{\lambda}\left[n_o - \left(\frac{\cos^2\theta}{n_o^2} + \frac{\sin^2\theta}{n_e^2}\right)^{-\frac{1}{2}}\right]$$

It will be observed that the retardation depends on the thickness of the crystal, the direction of propagation and the refractive indexes, all of which depend upon temperature and tuning angle. Accordingly, the fundamental is variably retarded and has elliptical polarization of an unpredictable nature. The major axis of the ellipse is in the same direction and parallel to the direction of polarization of the input wave. The second harmonic of $2f_1$ has the same polarization direction as the extraordinary polarization component of the input wave. The elliptically polarized fundamental and the second harmonic, which is not elliptically polarized, are shown emerging from the doubler crystal.

In the path of these emerging waves is a ellipticity corrector waveplate. This waveplate is of bi-refringent material, preferably crystal quartz, having a thickness which provides multiple order quarter wavelength retardation at the fundamental frequency (1.054 um in this example) while simultaneously giving full wave retardation at the second harmonic (0.527 um in this example). This waveplate is inserted in the beam path directly after the doubler crystal. The ellipticity is removed by setting the waveplate's fast axis in the direction of the major axis of the ellipse which represents the elliptical polarization of the fundamental as it emerges from the doubler crystal. The fast axis is the axis of the waveplate which provides the minimum retardation; in this case the quarter wave retardation at the fundamental. The ellipticity is caused in the doubler crystal by different indices of refraction for the orthogonal components of the fundamental mental radiation which is not mixed as it passes through the crystal. These indices of refraction depend on temperature and upon the tuning angle which the beam path makes with the crystal optic (z) axis. These are variables which can vary from day to day and depend upon environmental conditions and control. Accordingly the ellipticity is unpredictable. The ellipticity corrector waveplate retards one of the components of the elliptically polarized radiation (which is 90° out of phase with respect to the other). Because of the quarter wavelength retardation of one of the components, both components add in phase and the output of the waveplate is linearly polarized. The direction of linear polarization of the output from the ellipticity corrector waveplate depends upon the amount of the ellipticity originally introduced in the doubler cyrstal. The fundamental emerges from the quarter waveplate ellipticity corrector linearly polarized at some angle (shown as a°) with respect to the second harmonic which is unaffected by the waveplate. The angle a° may be determined by shifting the position of a plate having a transmissivity sensitive to polarization (a polarization analyzer for example).

The design of bi-refringent crystals such as quartz crystals to serve as a quarter wave retarder for a particular wavelength and a full wavelength retarder at another frequency is known in the optical engineering art (see for example Lu and Loeper, *Journal of the Optical Society of America*, 65, 3, 248 (1975), and Gerchanovskaya, *Optical Technology*, 41, 3, 185 (1974)).

Inasmuch as the fundamental and second harmonic waves must be orthogonal to each other in the type II tripler crystal, a second orthogonality corrector waveplate is used. This waveplate is made of bi-refringent crystal material, preferably crystal quartz. The thickness of the waveplate is such that it provides a multiple order halfwave retardation at the fundamental (1.054 um in this example). While simultaneously giving a full wave of retardation at the second harmonic (0.527 um). The fast axis of the orthogonality corrector waveplate is set at the bisector of the angle made by the polarization direction of the ellipticity corrected fundamental $f_1$ at the output of the ellipticity corrector waveplate and the horizontal plane which in this example is in a direction orthogonal to the second harmonic $2f_1$. Thus if the angle of the ellipticity corrected fundamental $f_1$ to the direction of the second harmonic is a°, the fast axis will be at the bisector of the angle of 90°−a° as shown by the dash line labeled fast axis in the drawing. The fundamental $f_1$ which provides effectively the extraordinary or e polarization for the tripler crystal is in the horizontal direction and the second harmonic at $2f_1$ which effectively provides the ordinary polarization for the tripler crystal is in the vertical direction as shown at the output of the orthogonality corrector waveplate. The tripler crystal is oriented such that the fundamental and second harmonic are in orthogonal planes and contribute to the generation of the third harmonic $3f_1$ which appears at the output and propagates to the target. The third harmonic may be separated from the fundamental and second harmonic by dichroic mirrors or beam splitters, one of which may be a polarization sensitive beam splitter, if desired. The beam is incident upon the target and provides the coupling characteristics inherent in the use of higher frequency radiation than the input fundamental frequency.

From the foregoing description, it will be apparent that there has been provided an improved system for wavelength conversion of coherent radiation and for the generation of harmonics of a fundamental beam of coherent radiation. Variations and modifications within the scope of the invention will undoubtedly suggest themselves to those skilled in the art. Accordingly, the foregoing description should be taken as illustrative and not in a limiting sense.

I claim:

1. Apparatus for converting the frequency of coherent radiation comprising first and second crystals having non-linear optical coefficients, and first and second waveplates between said crystals each having a different effect upon the polarization of the fundamental frequency component of said radiation to orient the polarization components of said radiation in predetermined relationship with respect to the axes of the second of said crystals.

2. The invention as set forth in claim 1 wherein said crystals are both Type II crystals, said first crystal being a frequency doubler and said second crystal being a frequency tripler of said fundamental frequency.

3. The invention as set forth in claim 2 wherein said first waveplate is disposed between said second waveplate and said first crystal and has a retardation of a quarter wavelength at said fundamental frequency and a retardation of a full wavelength at the second harmonic of said fundamental frequency, and said second waveplate has a retardation of a halfwave length at said fundamental frequency and a retardation of a full wavelength at said second harmonic frequency.

4. The invention as set forth in claim 1 wherein said first waveplate is a body of crystalline material having a fast axis in the same direction as the polarization direction of the fundamental on the input side of said first crystal, and said second waveplate is another body of crystalline material having a fast axis disposed along the bisector made between the polarization direction of the fundamental component at the output of said first waveplate and a direction orthogonal to the polarization direction of said second harmonic component at the output of said first waveplate.

5. The invention as set forth in claim 4 wherein said crystals have noncentrosymmetric crystalline structure.

6. The invention as set forth in claim 4 wherein said non-linear crystals are selected from the group consisting of KDP, CDA and ADP.

7. The invention as set forth in claim 4 wherein said waveplates are crystal quartz.

8. The invention as set forth in claim 4 wherein said crystals are KDP crystals and said waveplates are crystal quartz.

9. A third harmonic generator of the frequency of a beam of coherent radiation which comprises a pair of Type II crystals each having non-linear coefficients, one of said crystals being a second harmonic generator and the other of said crystals being a third harmonic generator, said crystals being arranged such that the radiation emerging from the second harmonic generator crystal enters the third harmonic generator crystal and emerges therefrom with a component at the third harmonic frequency, a pair of waveplates in the path of the radiation which emerges from the second harmonic generator crystal and enters the third harmonic generator crystal and upon which said emerging radiation is successively incident, a first of said waveplates upon which the radiation emerging from said second harmonic generator crystal is first incident having a retardance and being oriented such that the ellipticity of the emerging radiation at the fundamental frequency is corrected and linearly polarized radiation at said fundamental frequency emerges therefrom, and said second waveplate having a retardance which switches the orientation of the direction of polarization of the fundamental and second harmonic components of the radiation emerging from said second waveplate such that they are orthogonal to each other before entering said third harmonic generator crystal.

10. The invention as set forth in claim 9 wherein said crystals are disposed such that a beam of said radiation is incident thereon at a predetermined angle with respect to the optic (z) axis of said crystals such that the ordinary and extraordinary polarization component of said radiation enters said crystals in a first plane containing the projection of said z axis on the propagation direction of said beam and in another plane orthogonal thereto.

11. The invention as set forth in claim 9 wherein said first waveplate is a quarter wavelength retarder at the fundamental frequency of said radiation and a full wavelength retarder at the second harmonic thereof.

12. The invention as set forth in claim 11 wherein said first waveplate is oriented with the axis thereof which provides said quarter wavelength retardance at the same angle as the polarization of the radiation incident upon said second harmonic generator crystal.

13. The invention as set forth in claim 12 wherein said second waveplate has a retardance of a halfwavelength at said fundamental frequency of said radiation and a full wavelength at said second harmonic thereof.

14. The invention as set forth in claim 13 wherein said second crystal is oriented with the crystal axis thereof would provide said halfwave length retardance in the direction of the bisector between the polarization direction of the radiation at that fundamental frequency which emerges from said first crystal and a direction orthogonal to the polarization direction of the second harmonic of said radiation.

15. The invention as set forth in claim 14 wherein said second and third harmonic generating crystals are KDP crystals and said waveplates are quartz crystals.

* * * * *